United States Patent
Chen et al.

(10) Patent No.: US 7,844,845 B2
(45) Date of Patent: Nov. 30, 2010

(54) SYSTEM AND METHOD FOR PREVENTING USER O.S. IN VMM SYSTEM FROM DEENERGIZING DEVICE BEING USED BY SERVICE O.S.

(75) Inventors: Liang Chen, Raleigh, NC (US); Mark Charles Davis, Durham, NC (US); Seiichi Kawano, Kanagawa (JP); Rod David Waltermann, Rougemont, NC (US)

(73) Assignee: Lenovo (Singapore) Pte. Ltd. (SG)

( * ) Notice: Subject to any disclaimer, the term of this patent is extended or adjusted under 35 U.S.C. 154(b) by 576 days.

(21) Appl. No.: 11/949,983

(22) Filed: Dec. 4, 2007

(65) Prior Publication Data

US 2009/0144570 A1 Jun. 4, 2009

(51) Int. Cl.
*G06F 1/32* (2006.01)
(52) U.S. Cl. .................... 713/323; 713/320; 713/324
(58) Field of Classification Search .......... 713/300–324
See application file for complete search history.

(56) References Cited

U.S. PATENT DOCUMENTS

| 5,953,536 A * | 9/1999 | Nowlin, Jr. ............... 713/323 |
| 7,529,956 B2 * | 5/2009 | Stufflebeam ............. 713/320 |
| 2005/0003812 A1 * | 1/2005 | Gladwin et al. ......... 455/426.1 |
| 2008/0005494 A1 * | 1/2008 | Zimmer et al. ............ 711/152 |

\* cited by examiner

*Primary Examiner*—Dennis M Butler
(74) *Attorney, Agent, or Firm*—John L. Rogitz

(57) ABSTRACT

A call from a user operating system (UOS) to BIOS to configure a connected device into a reduced energy consumption mode is routed through a virtual machine monitor (VMM). The VMM determines whether a service O.S. (SOS) is in need of the device and if so the VMM informs the UOS that the device has been configured as ordered, while allowing the SOS to complete its task with the device. If the SOS is not in need of the device, or at the completion of the SOS task with the device, the VMM passes the call to ACPI/BIOS to configure the device in the demanded energy consumption mode.

21 Claims, 5 Drawing Sheets

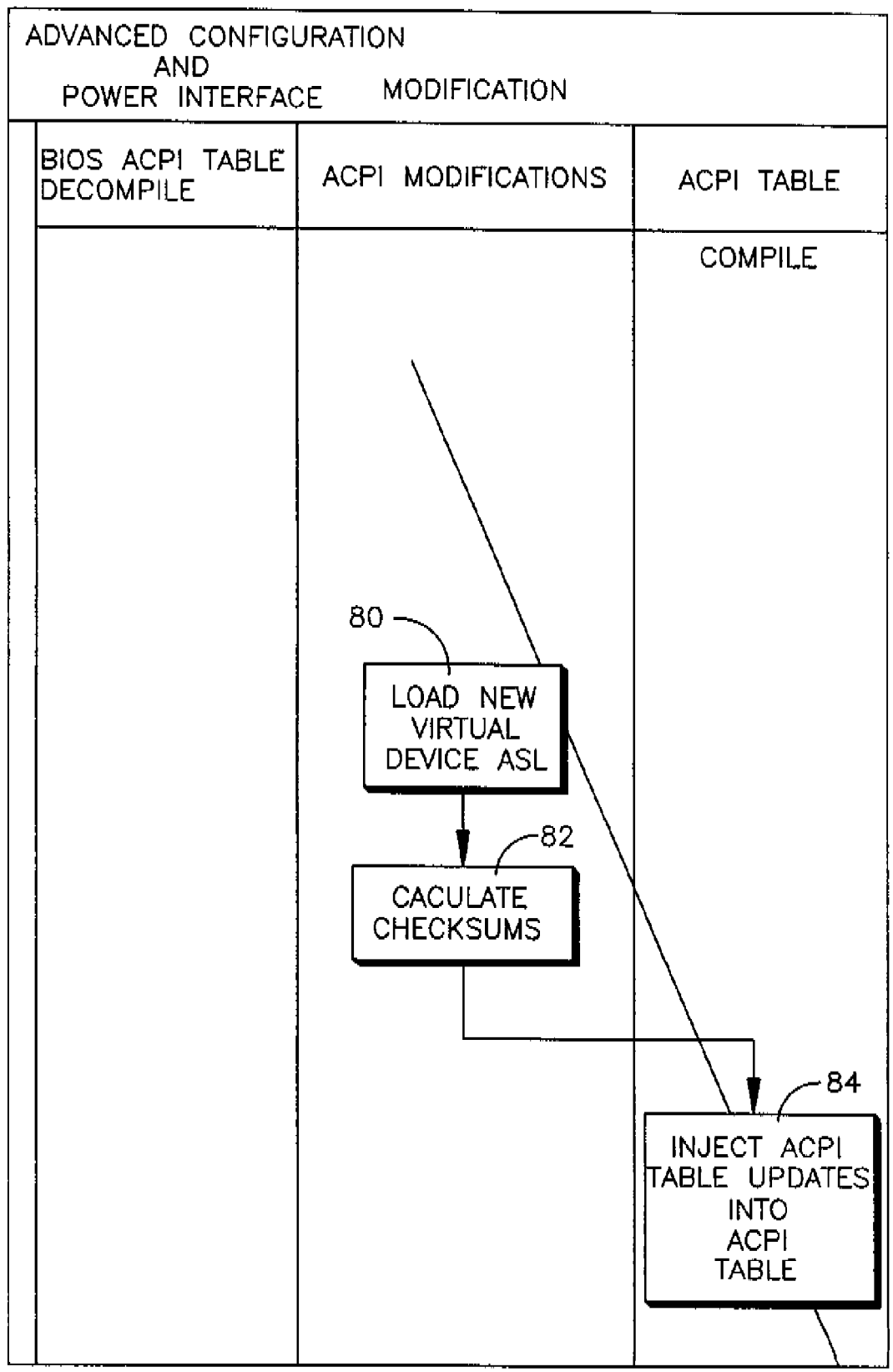

SYSTEM AND METHOD FOR PREVENTING USER O.S. IN VMM SYSTEM FROM DEENERGIZING DEVICE BEING USED BY SERVICE O.S.

FIELD OF THE INVENTION

The present invention relates generally to preventing a user operating system (UOS) in a virtual machine monitor (VMM) system from deenergizing devices pursuant to entering a low power mode that are being used by a service operating system (SOS).

BACKGROUND OF THE INVENTION

When a personal computer is turned on, a basic input-output system ("BIOS") that is stored in non-volatile solid state memory of the computer is invoked to begin what is known as a "boot" process, in which various initialization chores are undertaken. Among the most important of these chores is the copying of a user operating system (UOS) from disk storage of the computer over into a solid state memory of the computer, for execution of the UOS by the processor of the computer when the computer is being used. When the computer is turned off or when it is "re-booted", the UOS is flushed from the memory.

Once booted and running, a UOS may cause its computer to enter a so-called "low power" mode after a period of inactivity to conserve energy. Part of a "low power" mode may be to place various devices of the computer such as, e.g., a wireless transmitter, a computer monitor, a printer, a hard disk drive (HDD), etc. in reduced energy consumption modes. To do this, a UOS may access a data structure known as an "advanced configuration and power interface" (ACPI) table, which lists devices that might be candidates for low power mode operation, to enable the UOS to execute certain codes in BIOS to deenergize appropriate devices.

As understood herein, "virtual machine monitors" (VMM) have been introduced that are essentially supervisory operating systems operating in the background to coordinate, among other things, the simultaneous operation by a single processor of both a main UOS and a service operating system (SOS). As further understood herein, this feature of VMM use introduces a new problem, namely, the unwitting deenergization of a device, by the UOS pursuant to low power mode operation, that the SOS or indeed VMM itself may require.

SUMMARY OF THE INVENTION

In modern feature rich computers, it is necessary to provide a means for a VMM to give complete access to selected hardware, and even the system BIOS in order to provide the user with a full fidelity computing experience. As understood herein, providing this unshielded hardware access to the UOS may introduce control issues. This is expressly true when the UOS is given access to the ACPI tables, in which case the UOS has complete visibility to all devices in the system, some of which are shared with other operating environments, i.e. the SOS, and VMM.

To prevent the unwitting deenergization of a device by the UOS pursuant to a low power call to BIOS/ACPI if the SOS or indeed VMM itself is using or has need to use the devices, certain BIOS/ACPI calls from the UOS are intercepted by the VMM and examined to ensure premature device low power mode changing does not occur.

Accordingly, a method includes providing a user operating system (UOS) in a computer and configured to establish a low power state. A device associated with the computer is caused to enter a reduced energy consumption mode in the low power state. A virtual machine monitor (VMM) and service operating system (SOS) are provided in the computer, and the method includes selectively preventing the UOS from causing a device to enter the reduced energy consumption mode pursuant to a low power command. To do this, the VMM can be used to intercept reduced energy consumption mode calls such as so-called ACPI calls from the UOS to a basic input out system (BIOS).

In specific non-limiting embodiments the VMM determines whether a UOS call to BIOS is related to a device with which the SOS should interact prior to entering the reduced energy consumption mode, and if so, the VMM prevents the call from passing to BIOS until the SOS has completed its interaction with the device. If desired, however, the VMM may inform the UOS that the device enters the reduced operating mode prior to completion of interaction between the device and SOS, and can delay the call to BIOS until the SOS has completed its operations.

With even more particularity, in some embodiments the VMM determines whether a UOS call to BIOS, intended to cause a device to enter the reduced energy consumption mode, is related to a device with which the SOS should interact based on a device identification in a call from the UOS indicating the device is a virtual device. The device identification can be derived from a UOS advanced configuration and power interface (ACPI) table associated with the UOS. In this latter regard, the UOS ACPI table can be the same as an ACPI table in BIOS except for virtual device identifications in the UOS ACPI table being reflected as real device identifications in the table in BIOS. In contrast, an SOS ACPI table associated with the SOS can have a real device identification for each device in the UOS ACPI table having a virtual device identification and a virtual device identification for each device in the UOS ACPI table having a real device identification. Yet again, the VMM can be designated "owner" of all real devices, and all entries in both the SOS and UOS ACPI tables indicate virtual device IDs.

In another aspect, a computer has a UOS, a SOS configured for operating simultaneously with the UOS, and a virtual machine monitor (VMM) configured for coordinating operation of the UOS and SOS. The computer also includes a BIOS configured to communicate with the VMM and one or more devices reconfigurable in response to a call originated by the USO to the BIOS. The call is intercepted by the VMM and if the call is for a real device from the UOS that is solely "owned" by the UOS, the VMM immediately sends the call to the BIOS for execution thereof, and otherwise the VMM delays sending the call to the BIOS until the SOS has no further need of the device. By "solely owned" is meant that only the UOS ACPI table reflects a real device ID for the device, and no other ACPI table other than the BIOS ACPI table and VMM ACPI table reflects a real device ID for the device, i.e., all other ACPI tables either do not have the device, or show a virtual device ID for the device that does not require power management.

In another aspect, a tangible computer readable medium is executable by a digital processor to intercept a call from a UOS to a BIOS to configure a connected device into a demanded mode. The processor also determines whether a SOS is in need of the device and if so informs the UOS that the device has been configured as ordered, while allowing the SOS to complete its task with the device. Otherwise and also at the completion of the SOS task with the device, the processor passes the call to BIOS to configure the device in the demanded mode.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
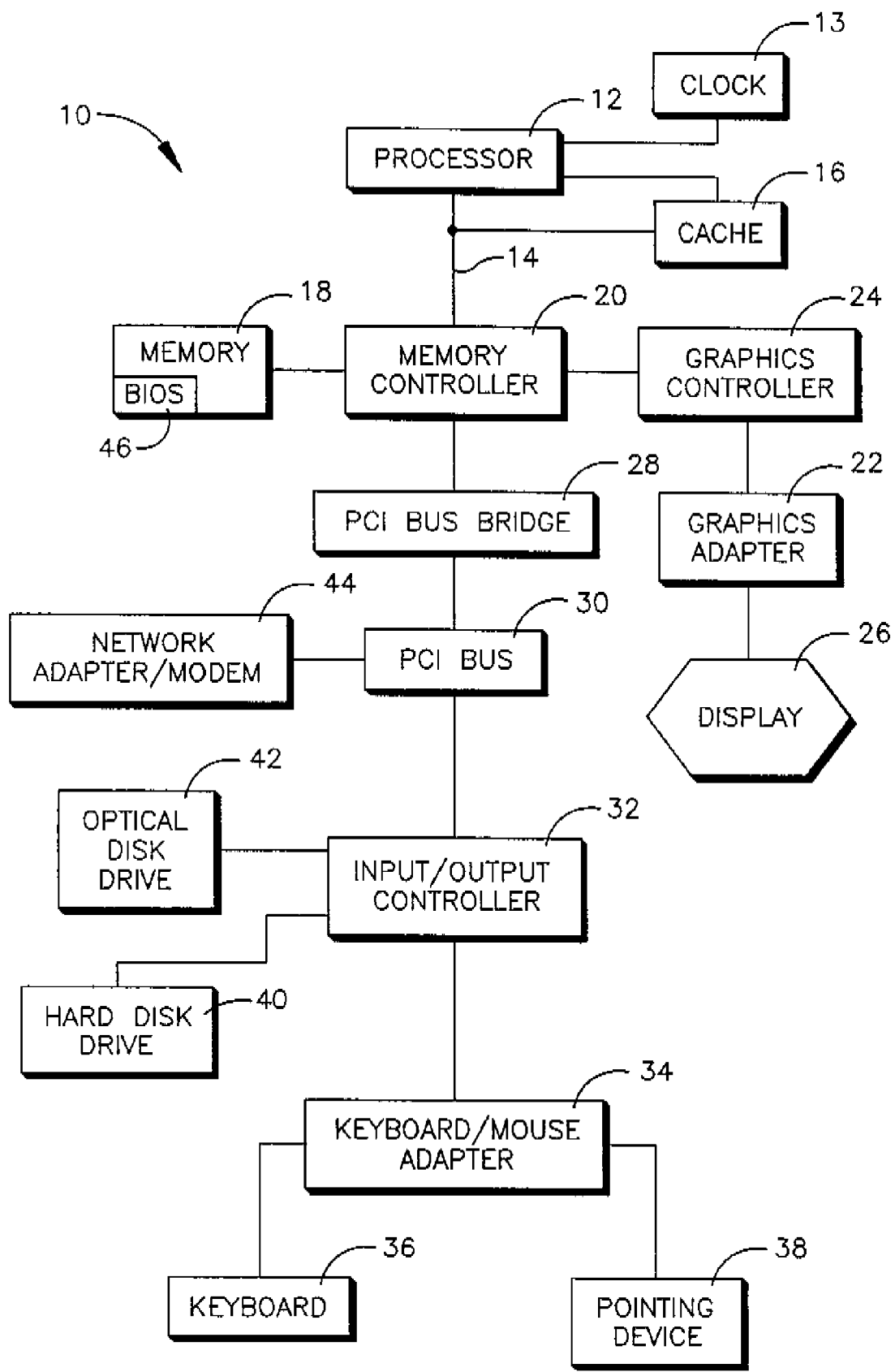
FIG. 1 is a block diagram of a non-limiting computer that can use the present invention.

Referring initially to FIG. 1, a high-level block diagram of a data processing system, generally designated 10, is shown in which the present invention may be implemented. The system 10 in one non-limiting embodiment is a personal computer or laptop computer. The system 10 includes a processor 12. The processor 12 can receive clock information from a clock 13 and can be connected to a processor bus 14, and a cache 16, which is used to stage data to and from the processor 12 at reduced access latency, is also connected to the processor bus 14. In non-limiting embodiments the processor 12 can access data from the cache 16 or from a system solid state memory 18 by way of a memory controller function 20. The cache 16 may include volatile memory such as DRAM and the memory 18 may include non-volatile memory such as flash memory. Also, the memory controller 20 is connected to a memory-mapped graphics adapter 22 by way of a graphic bus controller 24, and the graphics adapter 22 provides a connection for a monitor 26 on which the user interface of software executed within data processing system 10 is displayed.

The non-limiting memory controller 20 may also be connected to a personal computer interface (PCI) bus bridge 28, which provides an interface to a PCI bus 30. Connected to the PCI bus 30 may be an input/output (I/O) controller 32 for controlling various I/O devices, including, e.g., a keyboard/mouse adapter 34 which provides connection to a keyboard 36 and to a pointing device 38, which maybe implemented by a mouse, trackball, or the like. Additionally, a hard disk drive 40 is connected to the I/O controller 32. As is known in the art, the HDD 40 includes a controller that can access a master booth record (MBR) which can contain executable code as well as tabular data structures. If desired, an optical disk drive 42, such as a DVD or CD drive, can be connected to the I/O controller 32. In some implementations a network adapter 44 can be attached to the PCI bus 30 as shown for connecting the data processing system 10 to a local area network (LAN), the Internet, or both. In any case, in accordance with principles known in the art, during power-on the processor 12 executes a basic input/output system (BIOS) program 46 that may be stored in the memory 18, to load an operating system in the hard disk drive 40 into the memory 18.

Figure 2:
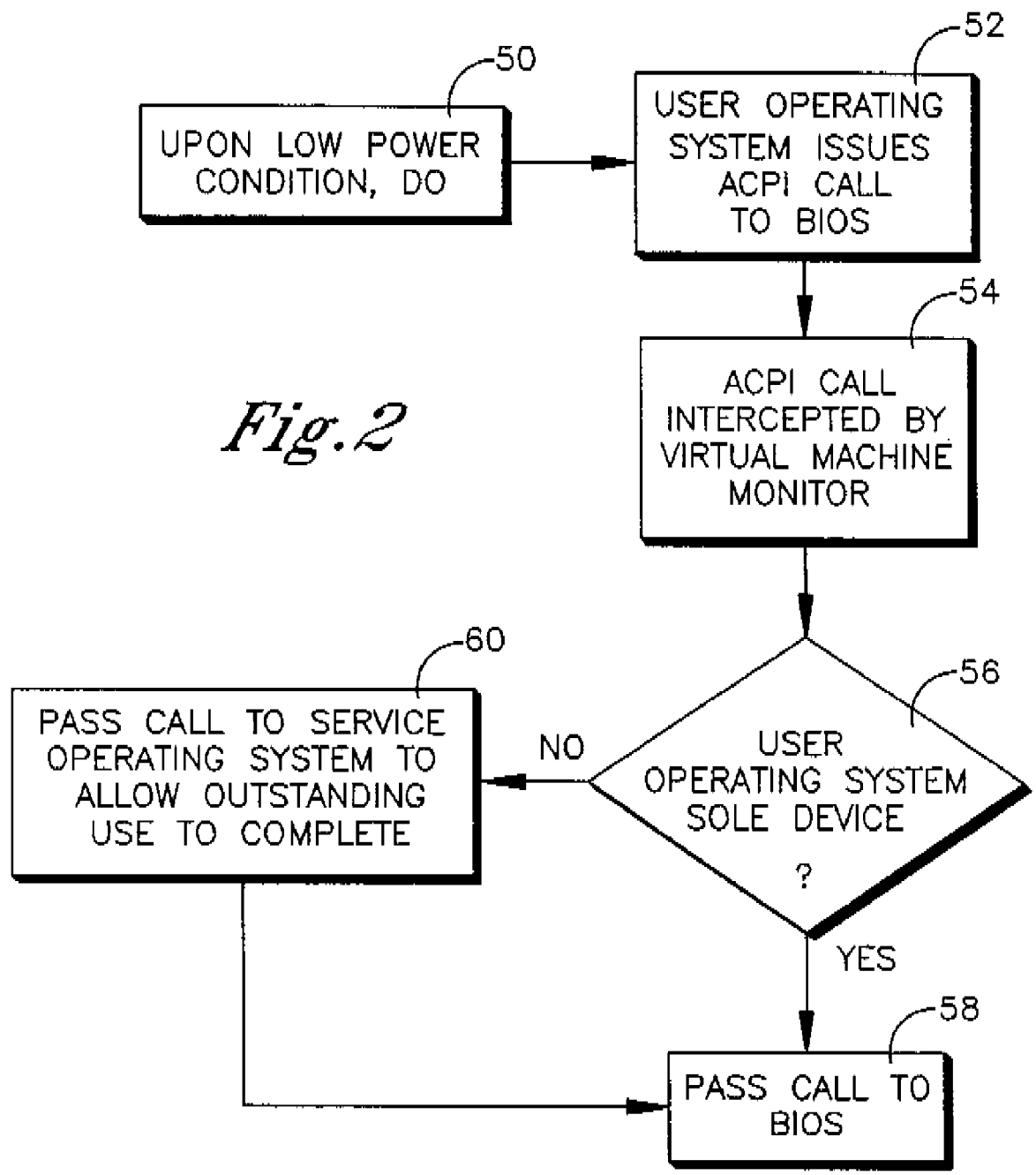
FIG. 2 shows a non-limiting flow chart of the present logic.

Now referring to FIG. 2, the process commences at state 50 wherein the UOS determines that a low power condition, e.g., the elapse of a predetermined period of time since user input activity, has been met. In this cases the logic moves to block 52 wherein the UOS issues one or more calls to BIOS to set certain devices such as but not limited to a wireless transmitter, the computer display 26, a printer, the HDD 40, even the complete system, etc. in a reduced energy state. Because, in a preferred non-limiting embodiment, these calls are predicated on the above-mentioned ACPI table, they are referred to in FIG. 2 as "ACPI" calls.

Block 54 indicates that the call(s) are intercepted by the virtual machine monitor (VMM) discussed further below, which determines for each call at decision diamond 56 whether the call under test is for a device that is not being used by or that does not imminently require use by a service O.S. (SOS) and/or by the VMM in accordance with further disclosure. If the call under test is for a device that does not implicate an O.S. other than the UOS, the logic moves to block 58 wherein the call is passed through to the BIOS 46 to cause the BIOS 46 to place the associated device in a reduced energy state. At this point, any reduced power status is reported to the UOS.

In contrast, if the call under test is for a device that implicates an O.S. other than the UOS, the logic moves to block 60. At block 60, the call is passed to, e.g., the SOS to allow any outstanding use of the device to be completed by the SOS, prior to passing the call to BIOS at block 58 to configure the device in a reduced energy state. As an example, the SOS can assume control of the HDD 40 and write out status or clean up the disk before the logic moves to block 58 to, e.g., cause BIOS to power down the HDD at block 58. As set forth further below, however, the VMM may signal the UOS that the device under test has been configured in the reduced energy state even though it has not yet been so configured, to, e.g., release a network port of the UOS associated with the device for other use.

Figure 3:
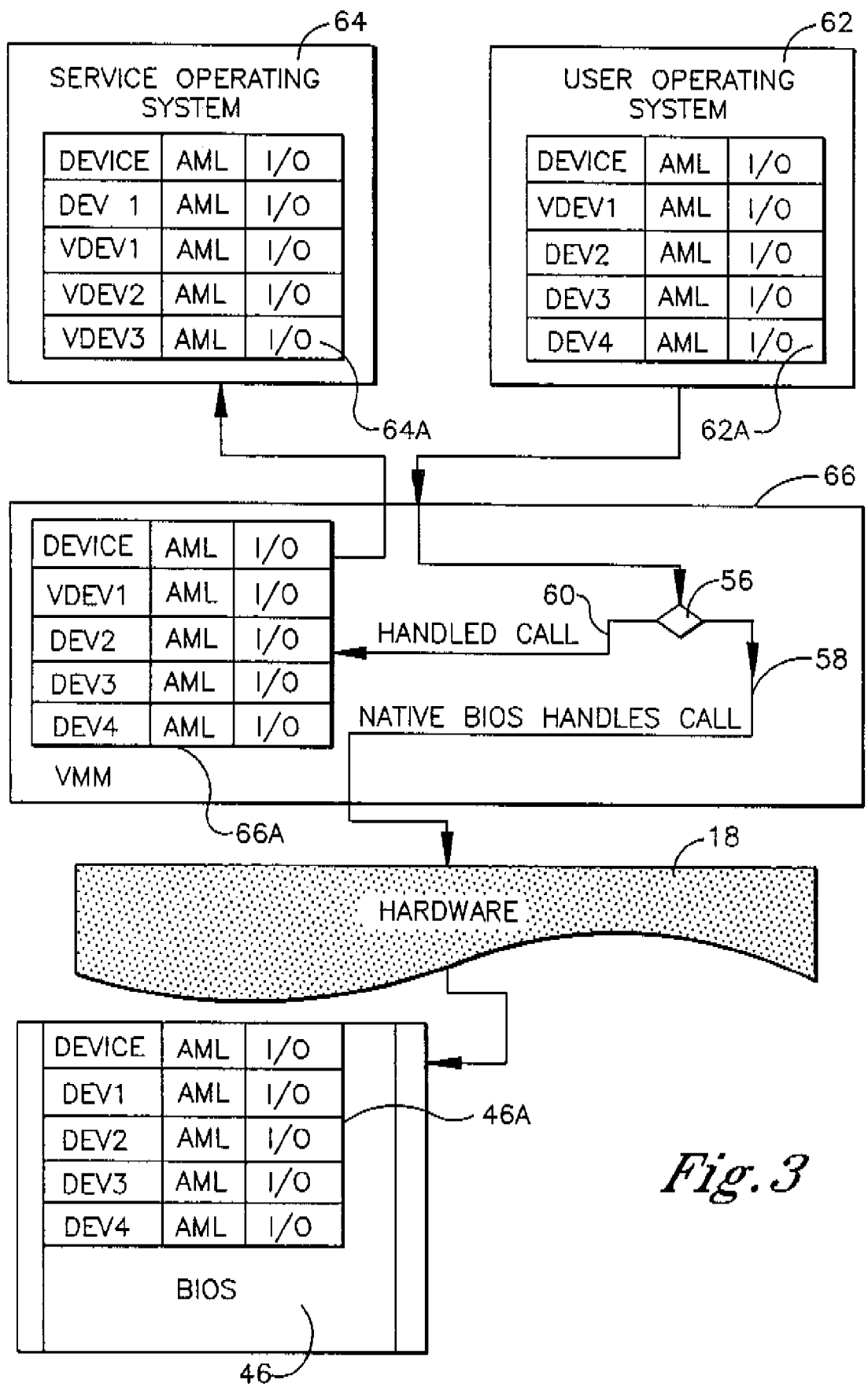
FIG. 3 is a block diagram of non-limiting architecture that can employ the logic of FIG. 2.

FIG. 3 provides further illustration of the logic shown in FIG. 2. The above-mentioned UOS is shown at 62, the SOS at 64, and the VMM at 66 in FIG. 3, along with their respective architectural relationships with the BIOS 46 and its associated hardware, e.g., the memory 18 or other hardware device on which BIOS resides.

As shown, each OS and BIOS includes its own respective copy of an associated ACPI table 62a, 64a, 66a, 46a. The ACPI tables each include a first column of device identifications, a second column of ACPI machine language (AML) codes, and a column of input/output (I/O) codes. In accordance with principles known in the art, the AML codes represent various power state parameters of the associated devices.

As shown in the non-limiting example of FIG. 3, however, the ACPI tables differ from each other in that the identifications in the device column indicate whether the associated device is "real" to the O.S. holding the particular table or "virtual". Thus, the ACPI table 62a of the UOS 62 indicates that devices 2-4 are "real" to the UOS but that device #1 is "virtual", whereas the opposite is true for the ACPI table 64a of the SOS, which indicates that devices 2-4 are virtual to the SOS but that device #1 is real. Both the ACPI table 66a of the VMM 66 and the ACPI table 46a of the BIOS 46 indicate the real physical device identifications for all devices. Alternatively, it is possible that a device will be listed as "real" in both the UOS ACPI table 62a and in the SOS ACPI table 64a, in which case both the UOS and SOS "own" the device.

It may now be understood that in one non-limiting implementation, the ACPI call at block 54 that is issued by the UOS contains the device identification from the ACPI table 62a of the UOS 62, and by means of determining whether the identification is for a virtual device or for a real device that is not also listed as "real" in the SOS ACPI table 64a at decision diamond 56 (mirrored in the diagram of FIG. 3) does the VMM determine whether to pass the call through to the BIOS at state 58 or to pass the call to the SOS 64 at state 60. That is, if the ACPI call contains a real device ID of a device not reflected as being "real" in any other ACPI table except that of the UOS (and VMM and BIOS), it is passed directly to BIOS at state 58, and if the ACPI call contains a virtual device ID it is passed first to the SOS 64 at state 60.

Figure 4:
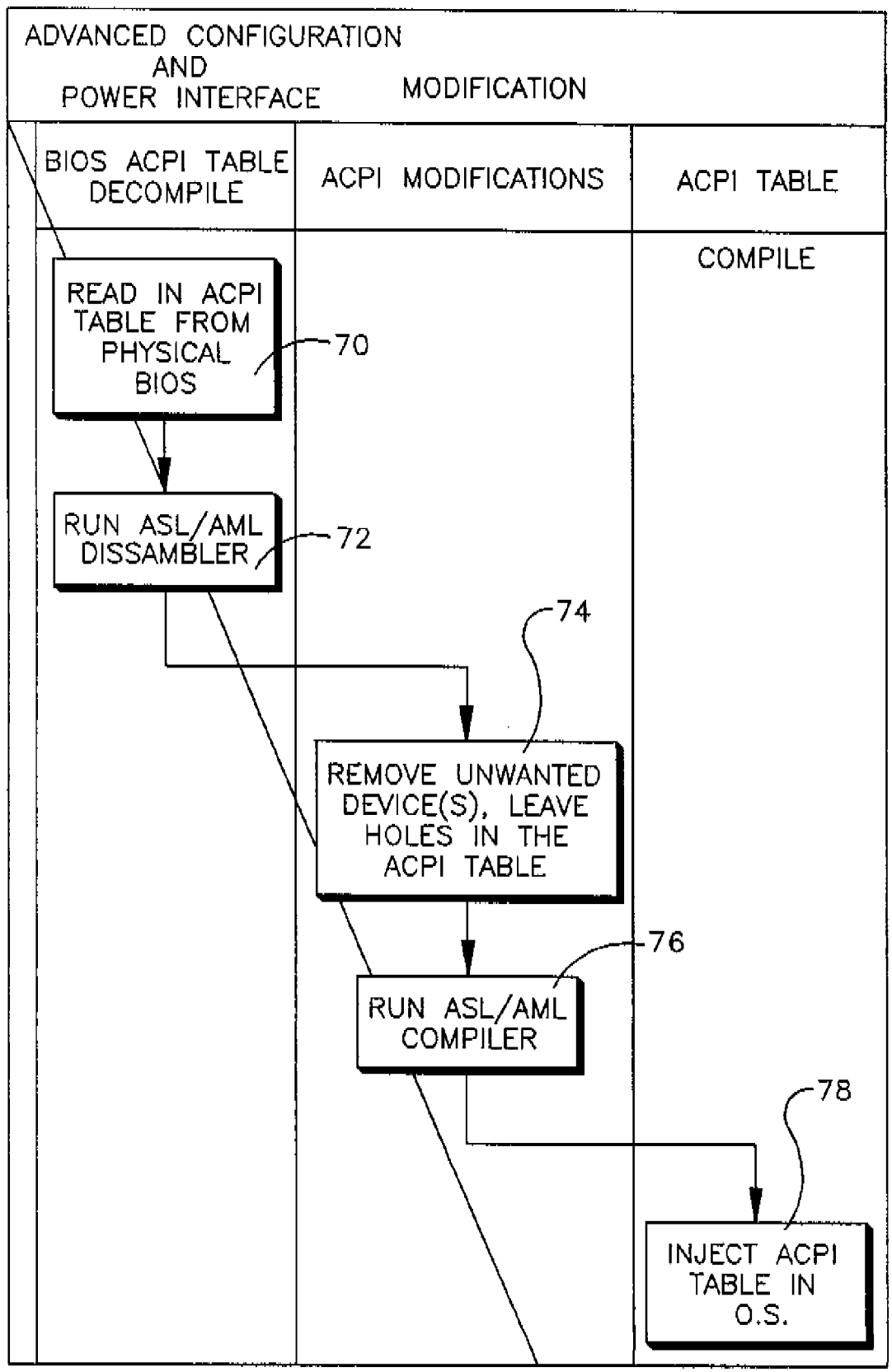
FIG. 4 is a flow chart of a non-limiting detailed implementation of the present logic.

FIG. 4 illustrates a non-limiting flow chart of a detailed implementation of the ACPI tables discussed above. As shown, the flow chart of FIG. 4 includes logic related to initial decompilation of the ACPI table from BIOS, juxtaposed with logic related to modifying the particular copy of the ACPI table being processed, followed by logic related to compiling various non-BIOS versions of the ACPI table.

Commencing at state 70 the ACPI table 46*a* is read in from BIOS 46 and an appropriate ACPI source language (ASL)/AML dissambler ran on the table at state 72. At state 74 for the particular non-BIOS ACPI table being processed, unwanted (i.e., non-real) devices for the associated O.S. are removed from the ACPI table and the table then compiled at state 76. The ACPI table is then injected into the associated O.S. at state 78.

At state 80 a virtual device(s) to replace the one(s) removed at state 74 is loaded into the non-BIOS ACPI table being generated and new checksums for entries in the table (which itself has a table checksum) calculated at state 82. The new virtual device(s) with checksums are injected into the ACPI table as updates at block 84. Thus, the SOS ACPI table 64*a* and UOS ACPI table 62*a* are updated on the fly as, e.g. SOS requirements for devices change.

In addition to the above, present principles can be used to protect, or hide selected personal computer interface (PCI) address ranges. The so-called "plug and play" (PnP) address space can be broken into two blocks, namely, a legacy block which allows for fixed addressing, and a PnP address range which does not allow for fixed address ranges. This may be effected by updating the ACPI name space to fool a PnP-aware OS into not probing, or assigning a device in the PnP address range. This feature can be useful when a physical PnP address range is split among multiple operating systems.

While the particular SYSTEM AND METHOD FOR PREVENTING USER O.S. IN VMM FROM DEENERGIZING DEVICE BEING USED BY SERVICE O.S. is herein shown and described in detail, it is to be understood that the subject matter which is encompassed by the present invention is limited only by the claims.

What is claimed is:

1. A method comprising:
providing a user operating system (UOS) in a computer and configured to establish a low power state, wherein at least one device associated with the computer is caused to enter a reduced energy consumption mode;
providing a virtual machine monitor (VMM) in the computer;
providing a service operating system (SOS) in the computer; and
selectively preventing the UOS from causing a device to enter the reduced energy consumption mode.

2. The method of claim 1, comprising using the VMM to intercept reduced energy consumption mode calls from the UOS.

3. The method of claim 2, wherein the VMM determines whether a UOS call to BIOS is related to a device with which the SOS should interact prior to entering the reduced energy consumption mode, and if so, the VMM prevents the call from passing to BIOS until the SOS has completed its interaction with the device.

4. The method of claim 3, wherein the VMM informs the UOS that the device enters the reduced operating mode prior to completion of interaction between the device and SOS.

5. The method of claim 3, wherein the VMM determines whether a UOS call to BIOS, intended to cause a device to enter the reduced energy consumption mode, is related to a device with which the SOS should interact at least in part based on a device identification in a call from the UOS indicating the device is a virtual device.

6. The method of claim 5, wherein the device identification sent in the call from the UOS is derived from a UOS advanced configuration and power interface (ACPI) table associated with the UOS.

7. The method of claim 6, wherein the UOS ACPI table is the same as an ACPI table in BIOS except for virtual device identifications in the UOS ACPI table being reflected as real device identifications in the table in BIOS.

8. The method of claim 7, wherein an SOS ACPI table is associated with the SOS, the SOS ACPI table having a real device identification for each device in the UOS ACPI table having a virtual device identification and a virtual device identification for each device in the UOS ACPI table having a real device identification.

9. The method of claim 7, wherein an SOS ACPI table is associated with the SOS, the SOS ACPI table having a real device identification for at least one device in the UOS ACPI table having a real device identification.

10. A computer, comprising:
at least one user operating system (UOS);
at least one service operating system (SOS) configured for operating simultaneously with the UOS;
a virtual machine monitor configured for coordinating operation of the UOS and SOS; and
at least one device reconfigurable in response to a call originated by the UOS, wherein the call is intercepted by the virtual machine monitor and if the call is for a real device from the UOS, the virtual machine monitor immediately sends the call on for execution thereof, and otherwise the virtual machine monitor delays sending the call on until the SOS has no further need of the device.

11. The computer of claim 10, further comprising:
at least one basic input output system (BIOS) configured to communicate with the virtual machine monitor and to receive the call from the UOS, wherein if the virtual machine monitor delays sending the call to the BIOS until the SOS has no further need of the device, the virtual machine monitor sends the call to BIOS for execution thereof when the SOS has no further need of the device.

12. The computer of claim 11, wherein the virtual machine monitor signals to the UOS that the call has been executed prior to the SOS having no further need of the device.

13. The computer of claim 11, wherein the virtual machine monitor delays sending the call to the BIOS at least in part based on a device identification in the call from the UOS indicating the device is a virtual device.

14. The computer of claim 13, wherein the device identification sent in the call from the UOS is derived from a UOS advanced configuration and power interface (ACPI) table associated with the UOS.

15. The computer of claim 14, wherein the UOS ACPI table is the same as an ACPI table in BIOS except for virtual device identifications in the UOS ACPI table being reflected as real device identifications in the table in BIOS.

16. The computer of claim 15, wherein an SOS ACPI table is associated with the SOS, the SOS ACPI table having a real device identification for each device in the UOS ACPI table having a virtual device identification and a virtual device identification for each device in the UOS ACPI table having a real device identification.

17. The computer of claim 15, wherein an SOS ACPI table is associated with the SOS, the SOS ACPI table having a real device identification for at least one device in the UOS ACPI table having a real device identification.

18. A tangible computer readable medium executable by a digital processor to:
  intercept at least one call from a user operating system (UOS) to a basic input out system (BIOS) to configure a connected device into a demanded mode;
  determine whether a service O.S. (SOS) is in need of the device and if so:
    inform the UOS that the device has been configured as ordered, while allowing the SOS to complete its task with the device;
  otherwise and at the completion of the SOS task with the device, pass the call to BIOS to configure the device in the demanded mode.

19. The tangible computer readable medium of claim 18, wherein the digital processor, to determine whether the SOS is in need of the device, uses a device identification in a call from the UOS indicating the device is a virtual device.

20. The tangible computer readable medium of claim 19, wherein the device identification sent in the call from the UOS is derived from a UOS advanced configuration and power interface (ACPI) table associated with the UOS.

21. The tangible computer readable medium of claim 20, wherein the UOS ACPI table is the same as an ACPI table in BIOS except for virtual device identifications in the UOS ACPI table being reflected as real device identifications in the table in BIOS.

* * * * *